United States Patent
Yoon et al.

(10) Patent No.: US 7,162,201 B2
(45) Date of Patent: Jan. 9, 2007

(54) REPEATER AND METHOD FOR AUTOMATICALLY SETTING OUTPUT SIGNAL LEVEL OF REPEATER

(75) Inventors: Young-Sang Yoon, Gyeonggi-do (KR); Chang-Rim Park, Incheon (KR); Woo-Gyu Jun, Incheon (KR)

(73) Assignee: Ace Technology (KR)

( * ) Notice: Subject to any disclaimer, the term of this patent is extended or adjusted under 35 U.S.C. 154(b) by 438 days.

(21) Appl. No.: 10/745,524

(22) Filed: Dec. 29, 2003

(65) Prior Publication Data

US 2004/0229587 A1 Nov. 18, 2004

(30) Foreign Application Priority Data

May 16, 2003 (KR) ............... 10-2003-0031343

(51) Int. Cl.
H04B 3/36 (2006.01)
H04B 7/15 (2006.01)

(52) U.S. Cl. .................... 455/7; 455/11.1; 455/16

(58) Field of Classification Search ............. 455/7, 455/11.1, 13.1, 16, 253.2, 8; 379/338; 178/70; 330/107, 136
See application file for complete search history.

(56) References Cited

U.S. PATENT DOCUMENTS 3,914,560 A * 10/1975 Greene ............... 379/400
6,388,518 B1 * 5/2002 Miyatani ............ 330/149
6,677,820 B1 * 1/2004 Miyatani ............ 330/149
6,993,287 B1 * 1/2006 O'Neill ............. 455/11.1
2004/0156094 A1 * 8/2004 Kawahara et al. ..... 359/333
2005/0107034 A1 * 5/2005 Lee et al. ........... 455/11.1
2005/0153653 A1 * 7/2005 Diao et al. .......... 455/11.1

FOREIGN PATENT DOCUMENTS

KR 1999-46576 7/1999

* cited by examiner

Primary Examiner—Sonny Trinh
(74) Attorney, Agent, or Firm—Venable LLP; Michael A. Sartori; Kavita B. Lepping

(57) ABSTRACT

A repeater and method for automatically setting output signal level of the repeater is disclosed. The repeater includes: a voltage detection unit for measuring a voltage of signal amplified by a plurality of the amplifiers; a digital variable resist unit for providing a reference voltage value $V_{ref}$; a comparison unit for comparing the detected voltage $V_{dec}$ from the voltage detection unit and the reference voltage value $V_{ref}$ from the digital variable resist unit; and a control unit for setting output signal level of the repeater by controlling the digital variable resistor unit to generate the reference voltage $V_{ref}$ to be identical to the detected voltage $V_{dec}$ and controlling an output of repeater based on the comparison result from the comparison unit after setting the output signal level of the repeater.

17 Claims, 6 Drawing Sheets

_____

REPEATER AND METHOD FOR AUTOMATICALLY SETTING OUTPUT SIGNAL LEVEL OF REPEATER

FIELD OF THE INVENTION

The present invention relates to a repeater and method for automatically setting output signal level of the repeater; and, more particularly, to a repeater, a method for automatically setting output signal level by adjusting a value of digital variable resistor in the repeater according to a level of input and output signals, and a computer readable recoding medium for executing the same method.

DESCRIPTION OF RELATED ARTS

Generally, there is a shadow area of a mobile communication system existed inside of building such as a basement. In the shadow area, communication between a portable telephone and a base station is not established. For overcoming interruption of the communication between a portable telephone and a base station in the shadow area, a plurality of repeaters amplifying signals is installed between the portable telephone and the base station. The repeater receives a signal transmitted from the base station, amplifies the received signal and transmits the received signal to the portable telephone. In the mean time, the repeater also receives a signal transmitted form the portable telephone, amplifies the received signal and transmits the received signal to the base station.

FIG. 1 is a diagram illustrating a conventional repeater. Referring to the FIG. 1, the repeater includes a forward signal process unit for processing forward signals in order to repeat signals from a base station to a portable telephone and a backward signal process unit for processing backward signals in order to repeat signals from the portable telephone to the base station. The both units of the repeater have same elements but symmetric structure. Hereinafter, the forward signal process unit for processing forward signal is explained and an explanation of the backward signal process unit is omitted since elements of the backward signal process unit are identical and have same rolls.

Referring to FIG. 1, at first, a forward input signal transmitted from the base station is amplified by a first amplifier 110 and the amplified input signal is inputted to a variable attenuator 111. By the variable attenuator 111, the inputted signal is attenuated to a predetermined level. The attenuated signal is re-amplified by a second amplifier 112 and the re-amplified signal is filtered by a first filter 113 for gaining desired bandwidth of signal. The filtered signal is re-amplified by a third amplifier 114 and a fourth amplifier 118. In a mean time, the number of the amplifiers and the variable attenuators is varied according to the level of the input signal. That is, it is possible that the number of amplifiers wound be reduced when the level of the input signal is high. Also, if the level of input signal is low, the input signal would not pass the variable attenuator.

In the above mentioned situation, a level of output signal of the repeater must to be properly set in order to smoothly communicate with the portable telephones and the base stations. For example, if an output signal having +40 dBm transmitted from the base station, it is inputted to the repeater after attenuating about −80 dB during propagation steps, and the level of the inputted signal of the repeater is −40 dBm. If the repeater must output signal with more than +10 dBm level, the gain of repeater must to be 50 dB. Therefore, the repeater must to be set to output an output signal of +10 dBm output signal level and to input an input signal of −40 dBm at the repeater.

FIG. 2 is a block diagram for explaining steps of setting output signal level of conventional repeater. Referring to FIG. 2, the detailed steps of setting output signal level is explained hereinafter.

The conventional method for setting an output signal level is an analogue type method that the output signal level is non-automatically set by the user. That is, when a signal having a certain level is inputted to the repeater through a signal generator, the user checks the level of output signal of the repeater by using a spectrum analyzer 213. The user manually adjusts a variable resistor 209 to have desired reference voltage $V_{ref}$ for maintaining a predetermined level of out signal of the repeater. For example, a variable resistor 209 is adjusted to generate output signal having +10 dBm output signal level with an input signal having −40 dBm input level. Therefore, if the variable resistor 209 is adjusted according to the above mentioned steps, the output signal would have 10 dB output signal level when the input signal has −40 dBm input level.

Operations of the conventional repeater after setting the output signal level is explained hereinafter.

A comparator 208 compares a reference voltage value $V_{ref}$ of the variable resistor 209 and a detected voltage $V_{dec}$ detected by a voltage detector 207. A comparison result of the comparator 208 is transmitted to a controller 210. The controller 210 determines ON/OFF state of a power switch 211 according to an output signal level of the repeater.

The ON/OFF state of a power switch 211 is determined as following steps.

If the reference voltage $V_{ref}$ is lower than the detected voltage $V_{dec}$, the controller 210 turns the power switch 211 OFF and accordingly, the fourth amplifier 212 is isolated. On the contrary, if the reference voltage $V_{ref}$ is higher than the detected voltage $V_{dec}$, the controller 210 turns the power switch 211 ON, and accordingly, the fourth amplifier 212 amplifies output signal.

FIG. 3 is a flowchart explaining a conventional method for setting output signal level of the conventional repeater. Referring to FIG. 3, the conventional method for setting output signal is explained hereinafter.

At the step 301, a signal generated by manually adjusting a signal generator 201 is inputted to a first amplifier 202. At the step 302, the output signal level of the repeater is check by a spectrum analyzer 213. At the step 303, a variable resistor 209 is manually adjusted in order to maintain a predetermined level of output signal. By adjusting the variable resistor 209, a reference voltage value $V_{ref}$ is also set and accordingly, the output signal level of the repeater is set at the step 304.

In a mean time, the comparator 208 compares the reference voltage $V_{ref}$ and a detected voltage $V_{dec}$ detected by a voltage detector 207 when the repeater is actually operated. The controller 210 determines ON/OFF state of a power switch 211 according to a result of comparison. That is, if a level of output signal is lower than a predetermined level ($V_{ref} > V_{dec}$), the power switch 211 becomes ON, however, if the level of output signal is higher than a predetermined level ($V_{ref} < V_{dec}$), the power switch 211 becomes OFF.

However, in the conventional method, a reliability of setting output signal level is decreased since the output signal level is manually adjusted by a user and thus, a performance of repeater becomes decreased too.

SUMMARY OF THE INVENTION

It is, therefore, an object of the present invention to provide a repeater and method for automatically setting an output signal level of the repeater by changing value of digital variable resistor of the repeater according to levels of input signal and output signal of the repeater.

It is another object of the present invention to provide a computer readable recoding medium for executing a method for automatically setting an output signal level by changing values of digital variable resistor of repeater according to input level and output signal level of the repeater.

In accordance with an aspect of the present invention, there is provided a repeater having a plurality of amplifiers for automatically setting an output signal level, including: an input unit for receiving an object input level and an object output level; a signal generation unit for generating a signal according to the inputted object input level; an amplifying unit for amplifying the signal outputted from the signal generation means; and a comparison unit for measuring a voltage of amplified signal from the amplifying means, setting an output level according to the measured voltage and controlling the output signal of the repeater.

In accordance with another aspect of the present invention, there is also provided a method for automatically setting output signal level of the repeater, the method including the steps of: a) inputting a desired input signal level and a desired output signal level; b) receiving an input signal for test according to the desired input signal level and the desired output signal level; c) providing a reference voltage gained by changing values of a digital variable resist means and the a detected voltage to a comparator; d) comparing the reference voltage and the detected voltage; and e) repeatedly performing steps a), b) and c) until having a comparison result that the reference voltage is identical to the detected voltage and setting the output signal level when the reference voltage is equal to the detected voltage.

In accordance with still another aspect of the present invention, there is also provided a computer readable recoding medium for storing instructions to executing a method for automatically setting output signal level of the repeater, the method including the steps of: a) inputting a desired input signal level and a desired output signal level; b) receiving an input signal for test according to the desired input signal level and the desired output signal level; c) providing a reference voltage gained by changing values of a digital variable resist means and the a detected voltage to a comparator; d) comparing the reference voltage and the detected voltage; and e) repeatedly performing steps a), b) and c) until having a comparison result that the reference voltage is identical to the detected voltage and setting the output signal level when the reference voltage is equal to the detected voltage.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
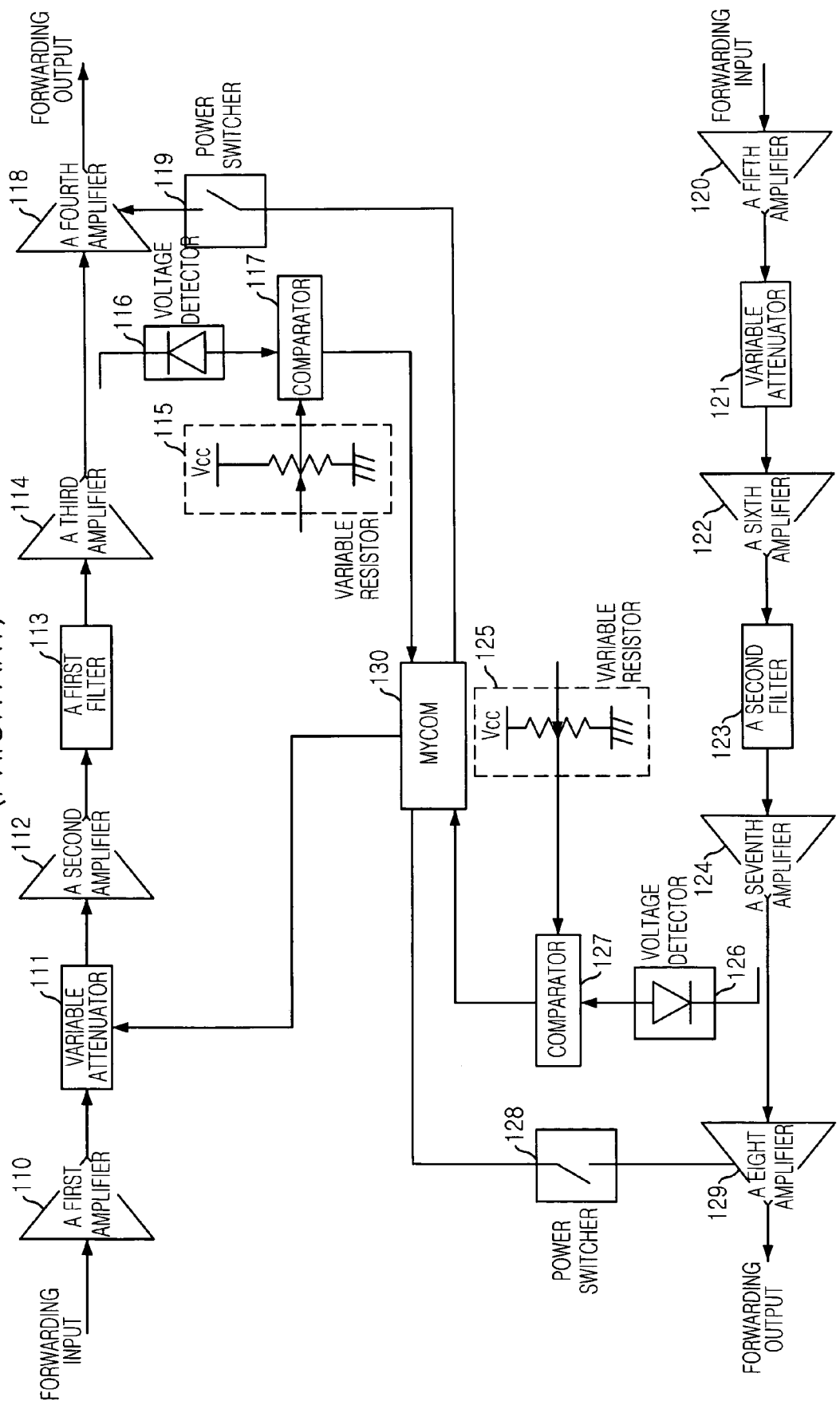
FIG. 1 is a diagram illustrating a conventional repeater.
Figure 2:
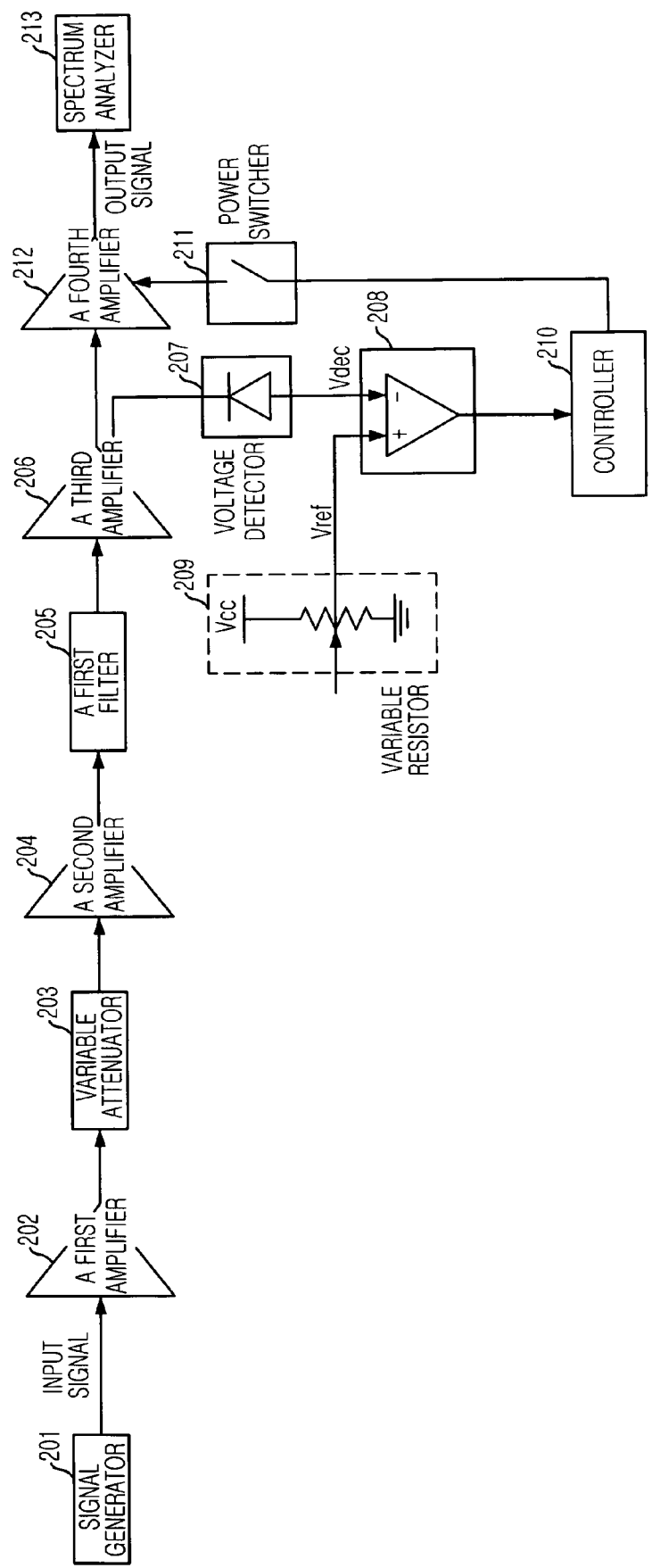
FIG. 2 is a block diagram for explaining steps of setting output signal level of conventional repeater.
Figure 3:
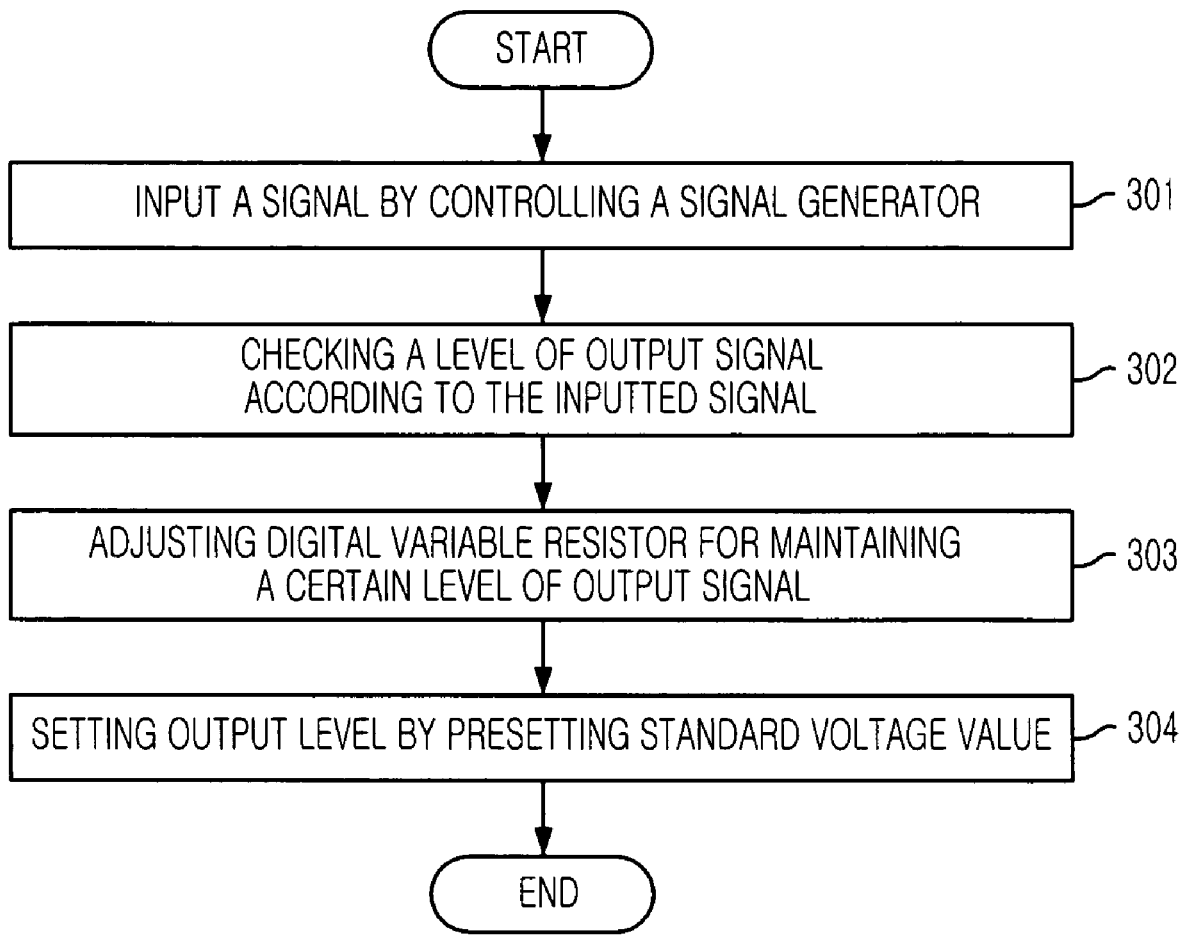
FIG. 3 is a flowchart for explaining a conventional method for setting output signal level.
Figure 4:
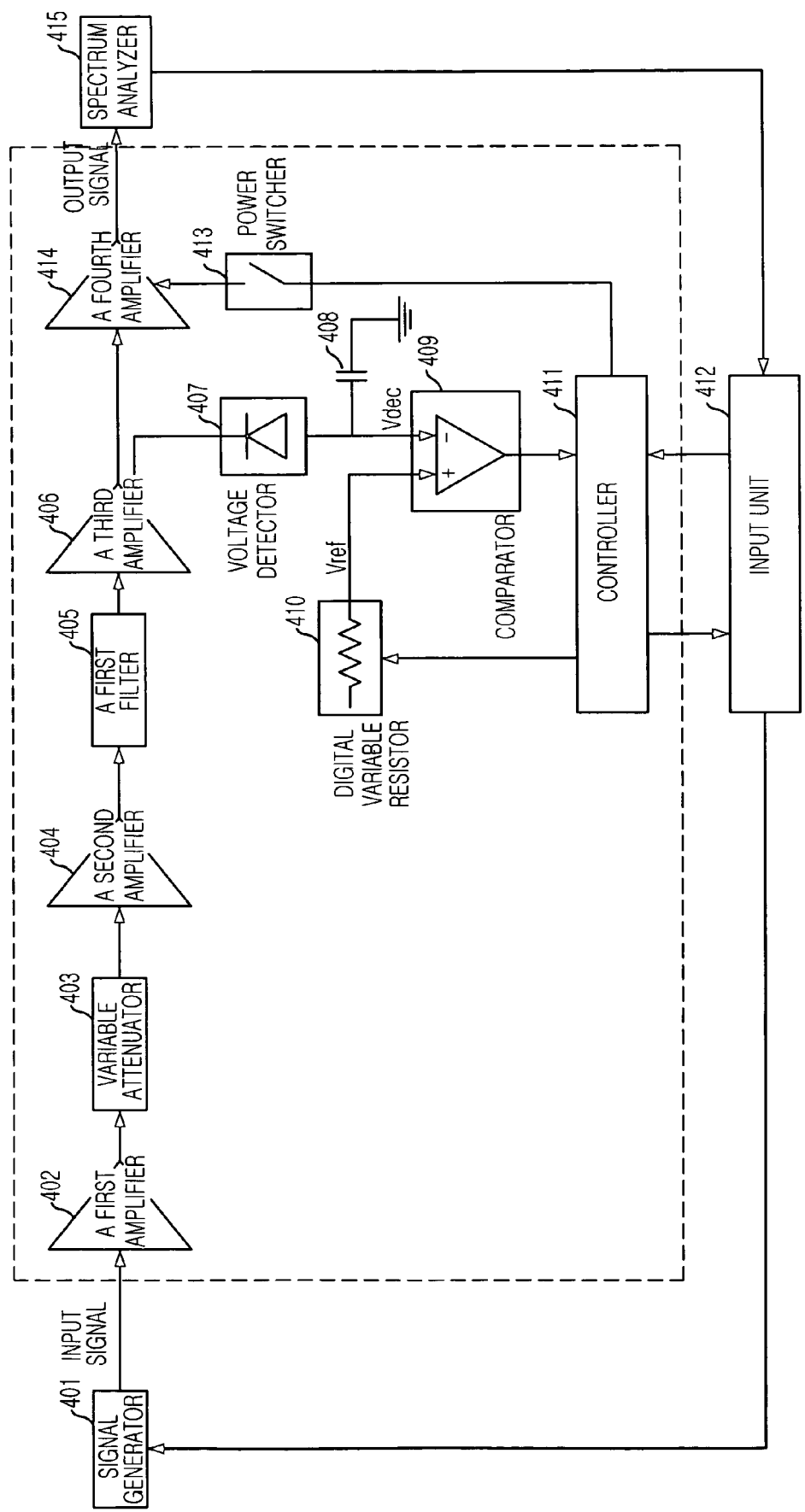
FIG. 4 is a block diagram illustrating a repeater in accordance with a preferred embodiment of the present invention.

FIG. 4 is a block diagram illustrating a repeater in accordance with a preferred embodiment of the present invention. Referring to FIG. 4, the repeater of the present invention automatically set the output signal level by using a controller 411. The controller 411 automatically adjusts a digital variable resistor 409 according to desired output signal level and input level when a user inputs desired input level and output signal level through an input unit 412. Hereinafter, operations of the repeater will be explained in detail.

Referring to FIG. 4, when the user inputs the desired input level and output signal levels through the input unit 412, the controller 411 starts to set an output signal level according to the inputted value of desired input level and output signal level. That is, the signal generator 401 generates a signal according to the input signal level and the signal is inputted to the repeater. The inputted signal is amplified by a plurality of amplifiers 402, 404, and 406, and is attenuated by a variable attenuator 403 for gaining desired bandwidth of signal.

In a meantime, the controller 411 provides a reference voltage value $V_{ref}$ to the comparator 409 by changing a value of digital variable resistor 410. The comparator 409 compares the reference voltage $V_{ref}$ and a detected voltage detected by the voltage detector 407 and a comparison result is transmitted to the controller 411. That is, the digital variable resistor 410 is controlled until value the detected voltage $V_{dec}$ becomes a voltage of desired output signal level. Also, a reliable voltage can be provided by additionally equipping a voltage ripple elimination circuit 408 between the voltage detector 407 and the comparator 409. The voltage ripple elimination circuit 408 eliminates a noise of the transmitted signal to the comparator 409.

The controller 411 determines whether setting of output signal level is completed or not based on the comparison result. If it is not completed then the value of digital variable voltage 410 is re-changed and the above mentioned steps are repeatedly performed for completely finishing setting the output signal level. The steps for setting output signal level are explained hereinafter.

The input unit 412 commands the controller 411 to be set the output signal level_in case that output signal level of spectrum analyzer 415 is equal to the desired output signal level.

The controller 411 sets the reference voltage $V_{ref}$ based on the detected voltage value $V_{dec}$ which is detected by the voltage detector 407. The reference voltage $V_{ref}$ becomes a voltage of desired output signal. The controller 411 determines a range of the voltage value based on the detected voltage $V_{dec}$ for determining value of digital variable resistor 410. The digital variable resistor 410 controls the reference voltage $V_{ref}$ and the range of the reference voltage value is established previously according to the detected voltage value.

In a meantime, the digital variable resistor 410 includes a plurality of resistors connected in serial each others, wherein each of the resistors has a small resist value. Therefore, the value of the digital variable resistor 410 is adjusted according to control the value of each of the resistors.

Accordingly, the controller 411 changes sequentially resistor value from the lowest value to the highest value in the determined range, selects appropriate resistor value among changed voltage value as the reference voltage $V_{ref}$ outputted digital variable resistor 410 and sets the selected resistor value for outputting definitely the reference voltage $V_{ref}$. For example, if the detected voltage $V_{dec}$ is 3.5V, the range for determining the reference voltage $V_{ref}$ of the digital variable resistor 410 is 3V~4V and the number of steps for determining the reference voltage $V_{ref}$ can be determined in this range. The step is a process for changing resister value of digital variable resistor 410. In the preferred embodiment of the present invention, the step is set as 32 or 100 steps and the number of steps can be increased for improving a resolution.

The comparator 409 compares the voltage value of the digital variable resistors and the detected voltage $V_{dec}$ from the 1$^{st}$ step to the last step and a result of the comparison is provided to the controller 411. The controller 411 determines whether setting of output signal level is completed or not according to the comparison result. That is, if the reference voltage $V_{ref}$ of the digital variable resistor 410 is lower, the reference voltage $V_{ref}$ is increased at the next step and comparison procedure is performed again. The above mentioned procedures are repeatedly performed until a step that the reference voltage $V_{ref}$ becomes identical to the detected voltage $V_{dec}$ and the reference voltage $V_{ref}$ is determined at the step that the reference voltage $V_{ref}$ becomes identical to the detected voltage $V_{dec}$. Finally, setting of output signal level is completed.

After completing setting output signal level, operations of the repeater is same as operations of the conventional repeater. The comparator 409 compares the detected voltage value $V_{dec}$ and the reference voltage value $V_{ref}$ and transmits a result of comparison to the controller 411. The controller 411 determines ON/OFF states of power switch 413 by analyzing an output signal level. That is, if the reference voltage $V_{ref}$ is lower than the detected voltage $V_{dec}$, the controller 411 turns the power switch 413 OFF in order to isolate the fourth amplifier 414. In contrary, if the reference voltage $V_{ref}$ is higher than the detected voltage $V_{dec}$, the controller 411 turns the power switch 413 ON in order to transmit the signal to the fourth amplifier 414. The fourth amplifier 414 amplifies the received signal and transmits the amplified signal.

Furthermore, the input unit 412 can be implemented as a micro computer. Also, operations of the controller can be stored in to the micro computer as a set of computer executable instructions to performing the operations of controller 411.

Figure 5:
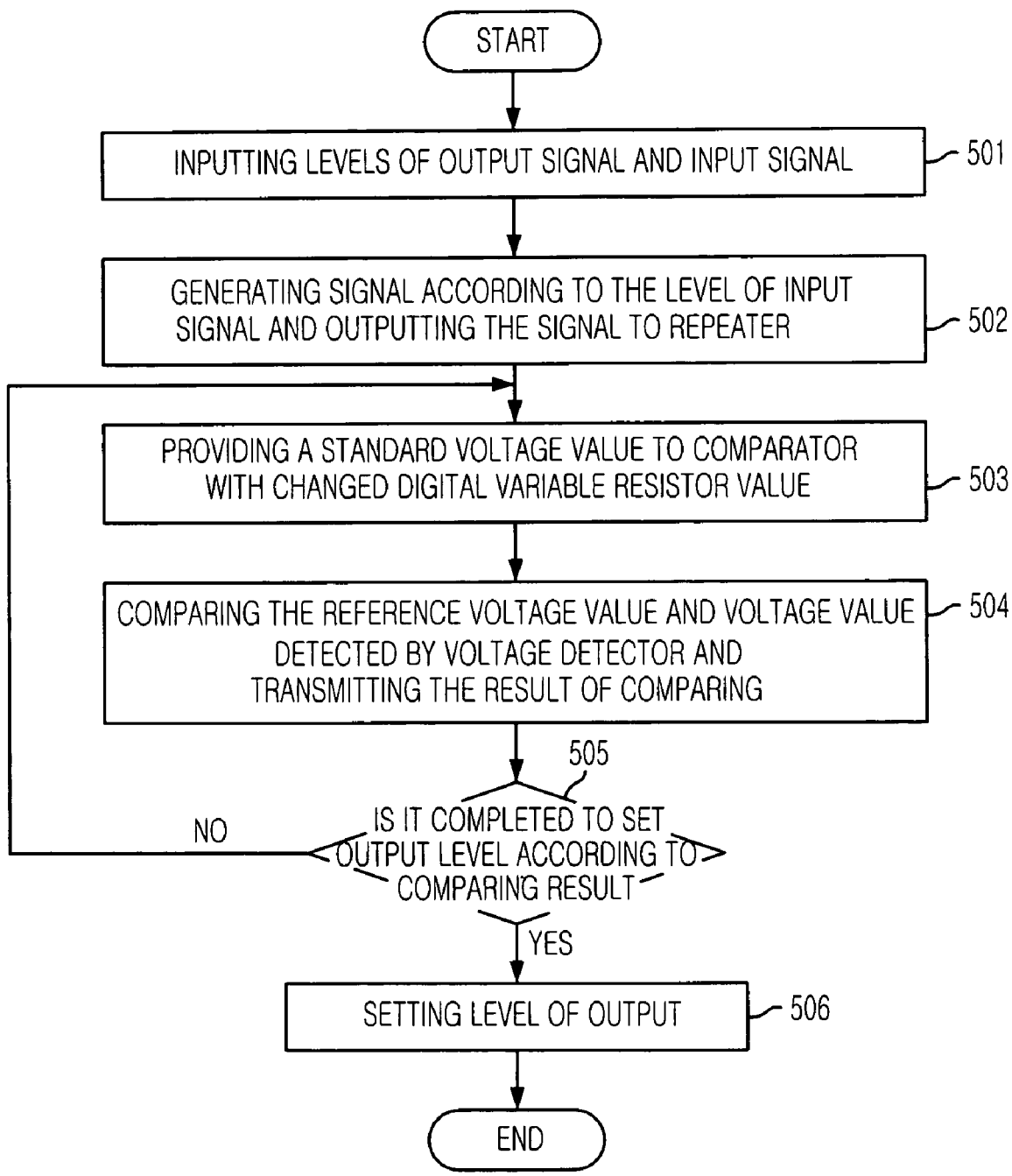
FIG. 5 is a flowchart explaining a method for automatically setting output signal level in accordance with a preferred embodiment of the present invention.

FIG. 5 is a flowchart explaining a method for automatically setting output signal level in accordance with a preferred embodiment of the present invention. Referring to FIG. 5, the method is explained in detail hereinafter.

At the step of 501, the user inputs desired input signal level and output signal level. According to the inputted signal levels, a signal generator 401 generates input signal for test and transmits the input signal to a repeater at step of 502. The controller 410 starts to set output signal level according to inputted desired input level and output signal level. That is, the controller 410 provides a reference voltage $V_{ref}$ by changing a voltage of a digital variable resistor 409. The comparator 408 compares the reference voltage $V_{ref}$ and the detected voltage $V_{dec}$ and transmits the comparison result at step 504. The controller 411 determines whether decision of output signal level is completed according to the comparison result. When the output signal level is not decided, the above mentioned steps are repeatedly performed until the output signal level is determined in order to set output signal level at step of 506.

Figure 6:
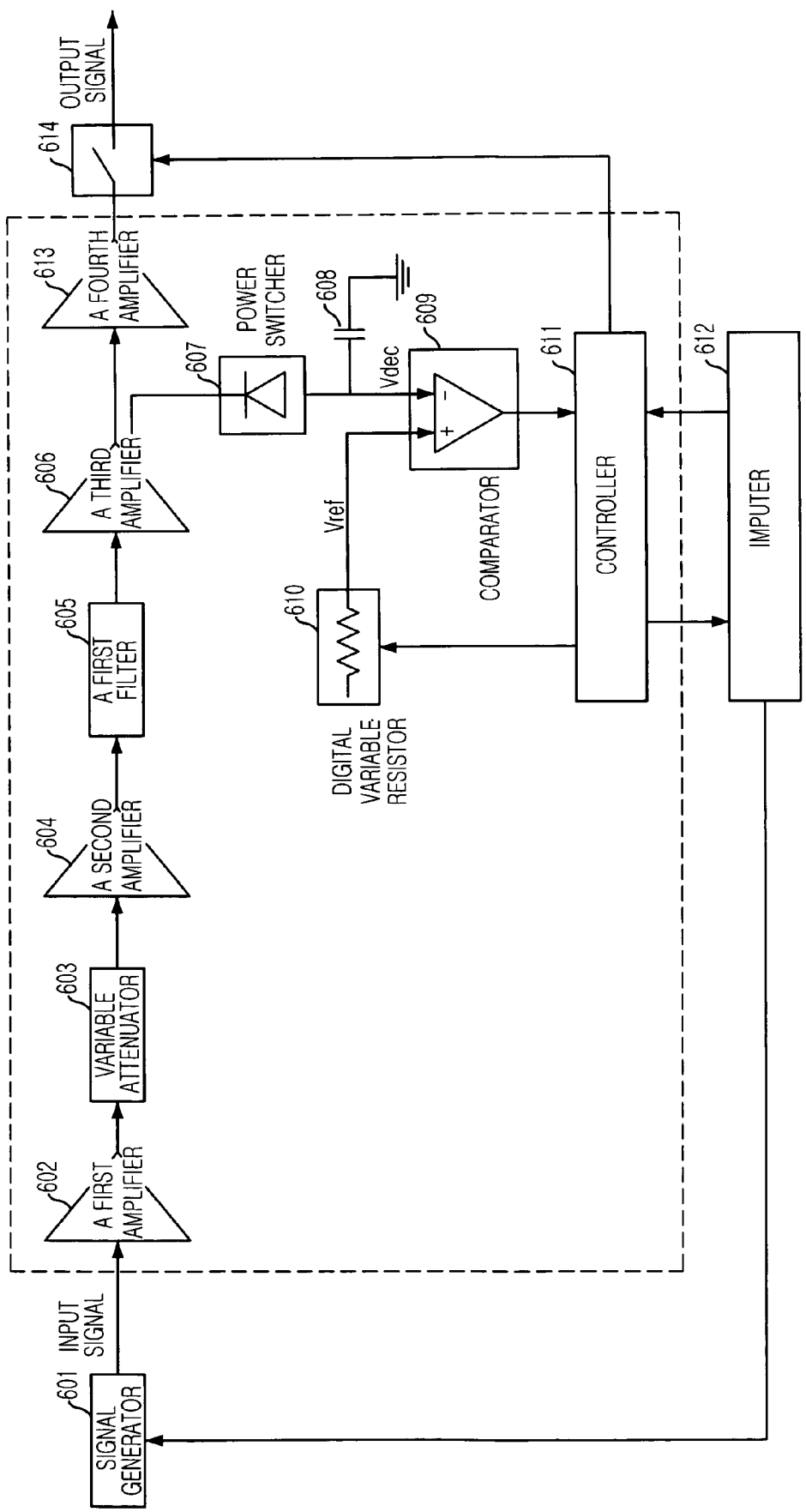
FIG. 6 is a diagram showing a repeater in accordance with another preferred embodiment of the present invention.

FIG. 6 is a diagram showing a repeater in accordance with another preferred embodiment of the present invention. Referring to FIG. 6, the repeater includes a RF switch 614 for turning ON/OFF state in order to isolate a fourth amplifier 613. Comparing to the repeater in FIG. 4, the RF switch 614 has same roll of the power switch 413. Other operations of the repeater are identical with the repeater in FIG. 4 and therefore, detailed explanation is omitted.

The method mentioned above can be implemented as a program and the program can be stored in a computer readable recoding medium such as a CD-ROM, a RAM, a ROM, a Floppy disk, a hard disk and an optical magnetic disk.

As mentioned above, the present invention can finely control output signal level by automatically controlling a digital variable resistor according to levels of input signal and output signal inputted from a user and also, productivity is improved by comparing to analogue type of conventional repeater.

While the present invention has been described with respect to certain preferred embodiments, it will be apparent to those skilled in the art that various changes and modifications may be made without departing from the scope of the invention as defined in the following claims.

What is claimed is:

1. A repeater having a plurality of amplifiers for automatically setting an output signal level, comprising:

an input means for receiving an object input level and an object output level;

a signal generation means for generating a signal according to the inputted object input level;

an amplifying means for amplifying the signal outputted from the signal generation means; and a comparison means for measuring a voltage of amplified signal from the amplifying means, setting an output level according to the measured voltage and controlling the output signal of the repeater;

wherein the comparison means includes:

a voltage detector for measuring a voltage of the amplified signal from the amplifying means;

a digital variable resistor for providing a reference voltage value;

a comparator for comparing the measured voltage from the voltage detector and the reference voltage value from the digital variable resistor and providing a result of comparison; and a controller for controlling the digital variable resistor in order to output the reference voltage value and controlling the output signal of the repeater by comparing the detected voltage from the voltage detector and the reference voltage value.

2. The repeater as recited in claim 1, wherein the digital variable resistor includes a plurality of resistors having small resist value, wherein the resistors are connected to each other in a series.

3. The repeater as recited in claim 1, wherein the control means sets the reference voltage by measuring voltage value inputted from the voltage detector according to the object input level is inputted from the input means and sets the output level of the voltage detector by controlling the digital variable resistor to make the reference voltage value and the input voltage value identical.

4. The repeater as recited in claim 1, wherein the controller controls the digital variable resistor means by orderly changing the voltage value from the lowest voltage value to the highest voltage value in a voltage value range according to the detected voltage value.

5. The repeater as recited in claim 4, wherein the voltage value range is predetermined in order to output the reference voltage value identical to the detected voltage value from the voltage detector.

6. The repeater as recited in claim 1, wherein the controller controls the output signal level of the repeater by turning ON/OFF the last amplifier among a plurality of the amplifiers in the amplifying means.

7. The repeater as recited in claim 1, wherein the input means invokes the controller to set an output level of the repeater in a case that the object output level is identical to an output value from the amplifying means, wherein the output value is an amplified object input signal outputted from the signal generator and the amplifying means.

8. The repeater as recited in claim 1, wherein the input means is a micro computer and contains computer executable instructions for performing operations of controlling means.

9. A method for automatically setting output signal level of the repeater, the method comprising the steps of:
  a) inputting a desired input signal level and a desired output signal level;
  b) receiving an input signal for test according to the desired input signal level and the desired output signal level;
  c) providing a reference voltage gained by changing values of a digital variable resist means and the a detected voltage to a comparator;
  d) comparing the reference voltage and the detected voltage; and
  e) repeatedly performing steps a), b) and c) until having a comparison result that the reference voltage is identical to the detected voltage and setting the output signal level when the reference voltage is equal to the detected voltage.

10. A computer readable recoding medium for storing instructions to executing a method for automatically setting output signal level of the repeater, the method comprising the steps of:
  a) inputting a desired input signal level and a desired output signal level;
  b) receiving an input signal for test according to the desired input signal level and the desired output signal level;
  c) providing a reference voltage gained by changing values of a digital variable resist means and the a detected voltage to a comparator;
  d) comparing the reference voltage and the detected voltage; and
  e) repeatedly performing steps a), b) and c) until having a comparison result that the reference voltage is identical to the detected voltage and setting the output signal level when the reference voltage is equal to the detected voltage.

11. A repeater having a plurality of amplifiers for automatically setting an output signal level, comprising:
  an input means for receiving an object input level and an object output level;
  a signal generation means for generating a signal according to the inputted object input level;
  an amplifying means for amplifying the signal outputted from the signal generation means; and
  a comparison means for measuring a voltage of amplified signal from the amplifying means, setting an output level according to the measured voltage and controlling the output signal of the repeater,
  wherein the input means invokes the controller to set an output level of the repeater in a case that the object output level is identical to an output value from the amplifying means, wherein the output value is an amplified object input signal outputted from the signal generator and the amplifying means.

12. The repeater as recited in claim 11, wherein the comparison means includes:
  a voltage detector for measuring a voltage of the amplified signal from the amplifying means;
  a digital variable resistor for providing a reference voltage value;
  a comparator for comparing the measured voltage from the voltage detector and the reference voltage value from the digital variable resistor and providing a result of comparison; and
  a controller for controlling the digital variable resistor in order to output the reference voltage value and controlling the output signal of the repeater by comparing the detected voltage from the voltage detector and the reference voltage value.

13. The repeater as recited in claim 12, wherein the digital variable resistor includes a plurality of resistors having small resist value, wherein the resistors are connected to each other in a series.

14. The repeater as recited in claim 12, wherein the control means sets the reference voltage by measuring voltage value inputted from the voltage detector according to the object input level is inputted from the input means and sets the output level of the voltage detector by controlling the digital variable resistor to make the reference voltage value and the input voltage value identical.

15. The repeater as recited in claim 12, wherein the controller controls the digital variable resistor means by orderly changing the voltage value from the lowest voltage value to the highest voltage value in a voltage value range according to the detected voltage value.

16. The repeater as recited in claim 15, wherein the voltage value range is predetermined in order to output the reference voltage value identical to the detected voltage value from the voltage detector.

17. The repeater as recited in claim 12, wherein the controller controls the output signal level of the repeater by turning ON/OFF the last amplifier among a plurality of the amplifiers in the amplifying means.

* * * * *